United States Patent [19]

Stephan, deceased et al.

[11] Patent Number: 5,303,993
[45] Date of Patent: Apr. 19, 1994

[54] CONTAINER FOR A MAGNETIC TAPE CASSETTE

[75] Inventors: Christoph Stephan, deceased, late of Fed. Rep. of Germany, by Dorothea Stephan; by Otto Stephan; and by Ilse Stephan, heirs

[73] Assignee: Artur Fischer GmbH & Co. KG., Tumlingen, Fed. Rep. of Germany

[21] Appl. No.: 964,379

[22] Filed: Oct. 21, 1992

[30] Foreign Application Priority Data

Oct. 22, 1991 [DE] Fed. Rep. of Germany ....... 4134812

[51] Int. Cl.$^5$ ..................... B65D 85/672; A47B 81/06
[52] U.S. Cl. ................................ 312/9.22; 312/9.57; 206/387
[58] Field of Search ............... 312/9.1, 9.9, 9.16, 312/9.19, 9.21, 9.22, 9.57; 360/96.5; 206/387

[56] References Cited

U.S. PATENT DOCUMENTS

| | | | |
|---|---|---|---|
| 3,677,396 | 7/1972 | Staar | 312/9.57 |
| 3,994,551 | 11/1976 | Ackeret | 206/387 X |
| 4,030,601 | 6/1977 | Ackeret | 312/9.22 |
| 4,399,913 | 8/1983 | Gelardi et al. | 206/387 |
| 4,738,361 | 4/1988 | Ackeret | 312/9.22 X |
| 4,747,484 | 5/1988 | Ackeret | 312/9.22 X |
| 4,828,341 | 5/1989 | Bohnet et al. | 312/9.57 X |
| 4,875,584 | 10/1989 | Ackeret | 312/9.22 X |

FOREIGN PATENT DOCUMENTS

| | | |
|---|---|---|
| 0171224 | 7/1985 | European Pat. Off. . |
| 0321937 | 12/1988 | European Pat. Off. . |
| 0383007 | 5/1990 | European Pat. Off. . |
| 2542722 | 8/1976 | Fed. Rep. of Germany . |
| 2059902 | 8/1970 | France . |
| 2274107 | 3/1975 | France . |

OTHER PUBLICATIONS

PCT/JP WO 87/06210.

*Primary Examiner*—Kenneth J. Dorner
*Assistant Examiner*—Nancy P. Connolly
*Attorney, Agent, or Firm*—Michael J. Striker

[57] ABSTRACT

A container having a plurality of receiving compartments is provided. Each of the receiving compartments have a base plate, a spring-loaded lockable slider member for engaging a magnetic tape cassette, locking devices, each of which including two adjacent independently pivotable rocker arms, and a sliding element on the base plate. The respective rocker arm matching the orientation of the magnetic tape cassette is brought into engagement by the sliding element provided with wedge-like control members to lock the reel hubs. To be able to use the same containers also for magnetic tape cassettes with closed reel hubs that are used for open reel hubs, the slider member is provided with centering elements and the sliding element is displacable by the centering elements into a middle position when the slider member is moved outward. When the slider member is moved inward and the sliding element remains in the middle position, a projecting ridge on the sliding element moves into a free space formed between the rocker arms so that no rocker arm is set upright.

3 Claims, 2 Drawing Sheets

CONTAINER FOR A MAGNETIC TAPE CASSETTE

BACKGROUND OF THE INVENTION

The present invention relates to a container for magnetic tape cassettes and, more particularly, to a container for magnetic tape cassettes having several receiving compartments separated from each other by base panels for longitudinal insertion of magnetic tape cassettes.

For longitudinal insertion of the magnetic tape cassette, DE-OS 40 39 954 describes a container for magnetic tape cassettes having locking devices, each of which is constituted by two rocker arms arranged side-by-side and pivotable independently of one another. In this container, a projection on the base plate is associated with each rocker arm for joint disengagement thereof, while for the locking action there is only one member available for both pairs of rocker arms of a locking device. This member is arranged on a sliding element which is mounted in the base plate and is displaceable with the magnetic tape cassette transversely to the direction of insertion. This special structure for longitudinal insertion of a magnetic tape cassette enables the tape to be locked regardless of orientation in which the cassette is placed on the slider member. The reel hubs of the cassettes are in fact arranged displaced from the middle in the longitudinal direction of the cassette, so that only the rocker arm displaced in the same direction is engaged. Because the member arranged on the sliding element in each case pushes upright only one rocker arm for engagement, the other rocker arm remains in the disengaged position. The respective matching rocker arm is thereby brought into engagement since the sliding element is displaced with the member arranged on it by the magnetic tape cassette. The displacement of the sliding element is effected by the elevation arranged on the cassettes, which comes into contact with an inclined wedge-like control member of the sliding element projecting beyond the top side of the base plate.

Apart from cassettes with open reel hubs, magnetic tape cassettes in which the reel hubs are closed by a plate are now also known. The closed plate at the same time also assumes the function of locking the tape, so that such cassettes no longer require the tape to be locked in the storage container. The closure of the reel hub means that containers that have fixed locking devices or locking devices which are set upright automatically for the reel hubs can no longer be used for storing such cassettes.

SUMMARY OF THE INVENTION

It is an object of the present invention to provide an improved container for magnetic tape cassettes, which can be used both for magnetic tape cassettes with open and closed reel hubs.

According to the invention, the container for magnetic tape cassettes comprises a plurality of receiving compartments, each of the compartments being formed for longitudinal insertion of a magnetic tape cassette having two reel hubs. Each of the receiving compartments includes a base plate; a lockable slider member mounted on the base plate; a spring element acting on the slider member to urge the slider member outwardly for unloading; locking devices arranged on the slider member, aligned in an insertion direction of the magnetic tape cassette and engaging the reel hubs of the magnetic tape cassettes, each of the locking devices being formed by two independently pivotable adjacent rocker arms; and a sliding element with wedge-like control members on the base plate and displaceable transversely to the insertion direction of the magnetic tape cassette. The sliding element has a projecting ridge for each of the locking devices for locking into one of the two rocker arms of the locking devices. The slider member is provided with centering elements formed and positioned so that, when the slider member is moved outward, the sliding element is moved into a middle position, and, when the slider member is moved inward with the sliding element remaining in the middle position, the projecting ridge is insertable into a free space formed between the two rocker arms of the locking device.

Using centering elements, when the slider member is moved outward the sliding element is displaced into a middle position in which, as the slider member is moved inward, the rocker arms are not actuated. In the middle position, the projecting ridges associated with the respective locking device are pushed into the free space formed between two adjacent rocker arms. Because the rocker arms are not set upright, a magnetic tape cassette that has closed reel hubs can be placed on the slider member. Such cassettes also have a cassette housing with flat external surfaces, so that the middle position the sliding element assumes when the slider member is moved outward is not changed when such a cassette is inserted.

The use of the container for storing conventional magnetic tape cassettes with open reel hubs is achieved through the facility for displacement of the sliding element by the elevation arranged on these cassettes. Depending on the position of the elevation, the sliding element is brought by the wedge-like control members arranged on it into the left-hand or right-hand position, in which, when the slider member with the cassette is inserted or moved inward, the left-hand or right-hand rocker arm of the locking devices is then set upright for engagement in the open reel hub of the magnetic tape cassette. The solution according to the invention therefore enables magnetic tape cassettes to be inserted longitudinally in any orientation and regardless of whether they have open or closed reel hubs.

The centering of the middle position can be effected either by centering elements, which are formed by two inclined faces arranged on the slider member at a distance from the wedge-like control members or by spring elements, which are arranged on the base plate in the region of the recess for the wedge-like control members and which engage the two wedge-like control members which engage the two wedge-like control members so as to center them.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENTS

Figure 1:
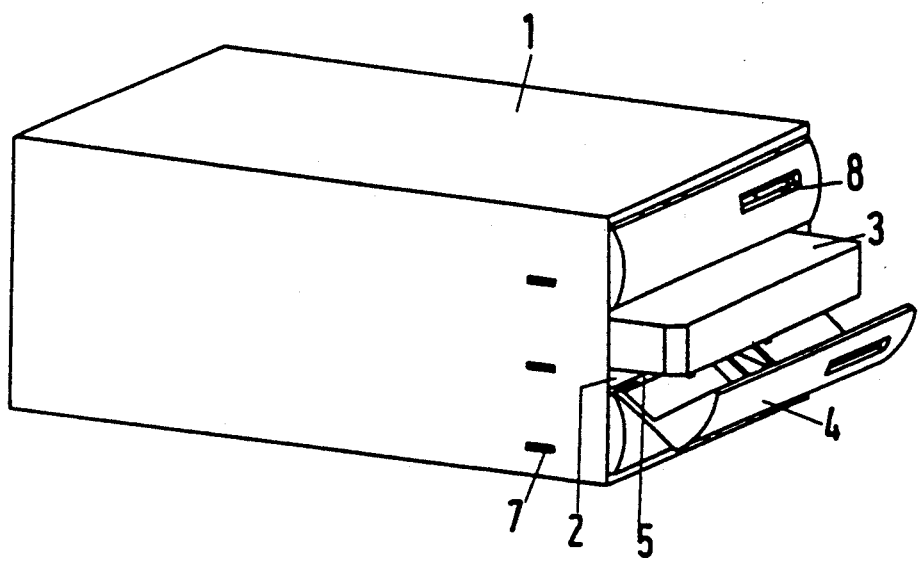
FIG. 1 is a perspective view of a container according to the invention having a plurality of receiving compartments for magnetic tape cassettes.

The container 1 shown in FIG. 1 has three receiving compartments 2 for magnetic tape cassettes 3. The closure flap 4 of the middle receiving space 2 is shown open for removal of a magnetic tape cassette. The receiving compartments 2 are formed by base plates 5, which are inserted on rails of the side walls of the container 1 and, for example, can be held in place with locking projections engaged in apertures 7 of the side walls. The closure flap 4 is provided with windows 8 so that the presence of a cassette in the receiving compartment 2 can be ascertained without opening the closure flap 4.

Figure 2:
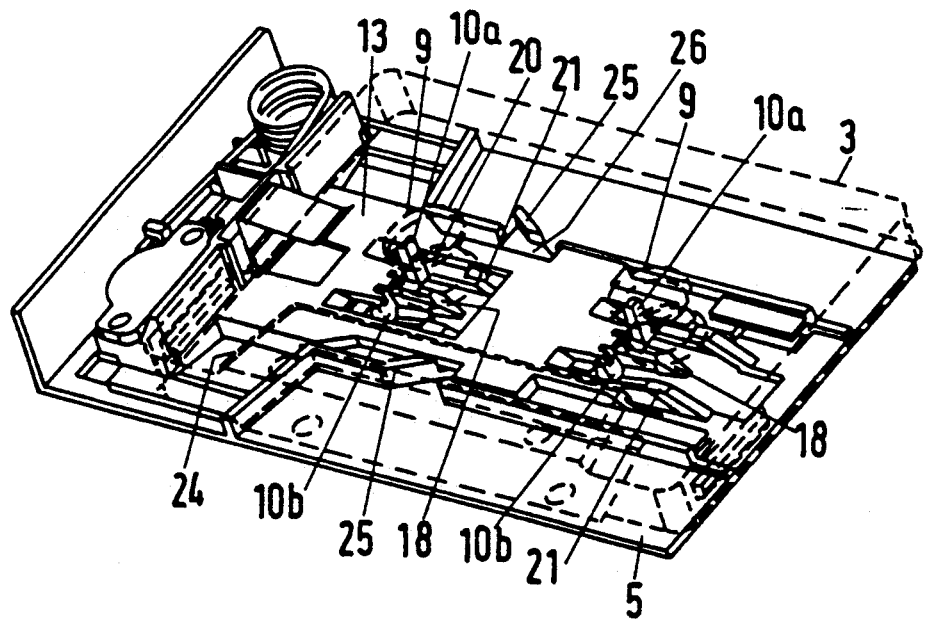
FIG. 2 is a perspective view of a base plate from the container of FIG. 1 with slider member moved inward and holding a magnetic tape cassette shown with dashed lines with open reel hubs.

The base plate 5 shown in FIG. 2 is provided for a container, which has no one closure flap 4 or a closure flap 4 arranged directly on the housing. Furthermore this base plate 5 shown in this figure is suitable for longitudinal insertion of the cassettes 3 in both situations. This is achieved because each locking device is formed by two side-by-side independently pivotable rocker arms 10a, 10b, on which projecting pegs 20 are arranged at right angles. Both rocker arms 10a, 10b are displaced about the same amount from the center as the reel hubs 9 of a magnetic tape cassette 3. When the slider member 13 is moved outward, the rocker arms are disengaged by projecting pieces 21 associated with each rocker arm.

Figure 3:
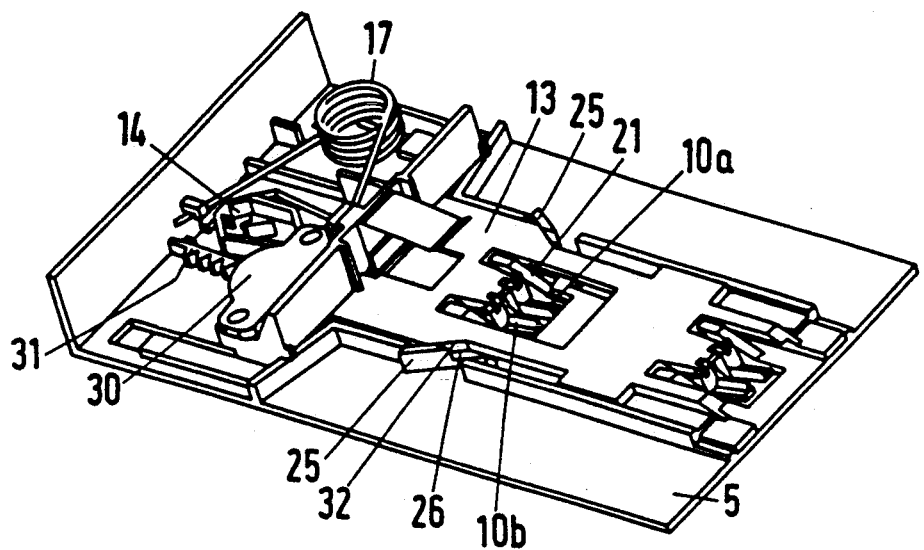
FIG. 3 is a perspective view of a base plate in the container of FIG. 1 with slider member moved outward and slider element centered in a middle position.

As shown in FIG. 3 the slider member 13 is urged by the spring element 17 into the unloading or removal position, in which all rocker arms 10a, 10b have been disengaged by pegs 20 running beneath and engaging projecting pieces 21. For damped outward travel of the slider member 13, a damping element 30 which engages in a toothed rack 31 on the base plate 5 is provided on the slider member 13. A groove-shaped curved path 14 is machined into the base plate 5. A groove-shaped curved path 14 is machined in the base plate 5 at the rear end thereof, which, together with the tongue arranged on the slider member 13 and engaging with a projection on the curved path 14, forms a closure mechanism which can be both unlocked and locked by pressure on the slider member 13. As the slider member 13 travels outward, by centering elements arranged on the slider member in the form of sloping faces 32 the wedge-like control members 25 of the sliding element 26 are centered in a middle position, which is, at the same time, the starting position for receiving the magnetic tape cassette to be inserted in the container. If a magnetic tape cassette 3 with open reel hubs 9 is inserted into the receiving compartment 2, as shown in FIG. 2, depending on the orientation of the cassette the sliding element 26 is displaced by the cassette elevation 24 by abutting the wedge-like control member 25 transversely to the direction of insertion of the cassette into the opposite end position. Because of this, the projecting ridge 18 arranged on the sliding element 26 is displaced beneath the respective rocker arm 10a matching this orientation of the magnetic tape cassette. The rocker arms are set upright by running onto the projecting ridges 18 and lock into the open reel hubs 9.

Figure 4:
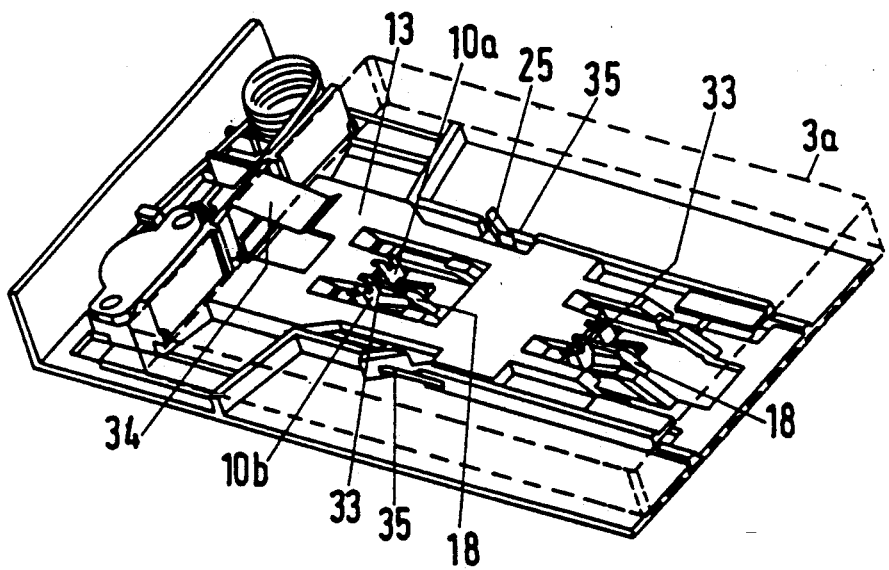
FIG. 4 is a perspective view of another embodiment of the base plate with slider member moved inward and holding a magnetic tape cassette shown with dashed lines with closed spools.

On insertion of a magnetic tape cassette 3a with closed reel hubs and without elevation 24, as shown in FIG. 4, the sliding element 26 is not displaced from the middle position centered in FIG. 3. On insertion of the slider member 13 with the magnetic tape cassette 3a, the projecting ridge 18 passes through the free space 33 formed between the two rocker arms 10a, 10b without setting a rocker arm upright. Thus, magnetic tape cassettes 3 with open reel hubs can be inserted, regardless of their orientation, in the receiving compartment 2 of the container 1, as well as in an embodiment with no closure flap. The clamping element 34 which holds the cassette is advantageously provided as shown in FIG. 4. For centering the middle position of the sliding element 26, FIG. 4 illustrates an embodiment of the centering elements which are formed by spring elements 35 arranged on the base plate 5 and pressing on the outer surface of the wedge-like control members 25.

It will be understood that each of the elements described above, or two or more together, may also find a useful application in other types of constructions differing from the types described above.

While the invention has been illustrated and described as embodied in a container for a magnetic tape cassette, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A container for magnetic tape cassettes, said container comprising a plurality of receiving compartments, each of the compartments being formed for longitudinal insertion of a magnetic tape cassette having two reel hubs; and each of said receiving compartments having a base plate, a lockable slider member mounted on the base plate, a spring element acting on the slider member to urge the slider member outwardly for unlocking, locking devices arranged on the slider member, said locking device being aligned in an insertion direction of the magnetic tape cassette and engaging the reel hubs of the magnetic tape cassettes, each of said locking devices being formed by two independently pivotable adjacent rocker arms, and a sliding element with wedge-like control members on the base plate and displacable transversely to the insertion direction of the magnetic tape cassette, said sliding element having a projecting ridge for each of the loading devices for locking into one of the two rocker arms of the locking devices, and wherein the slider member (13) is provided with centering elements (32) formed and positioned so that, when the slider member (13) is moved outward, the sliding element (26) is moved into a middle position, and, when the slider member is moved inward with the sliding element (26) remaining in the middle position, the projecting ridge (18) is insertable into a free space (33) formed between the two rocking arms (10a, 10b) of the locking device.

2. A container according to claim 1, wherein the centering elements (32) are sloping faces on the slider member, said sloping faces being spaced from the wedge-like control members when said slider member is moved inward, but said sloping faces coming into contact with the wedge-like control members (25) when the slider member is moved outward to an end position for unloading.

3. A container according to claim 1, wherein the centering elements (32) are spring elements (25) on the base plate in the vicinity of a recess for the wedge-like control members, said spring elements engaging the two wedge-like control members to center the wedge-like control members.

* * * * *